United States Patent [19]

Casey

[11] Patent Number: 4,906,088
[45] Date of Patent: Mar. 6, 1990

[54] READILY ATTACHABLE AUXILIARY WIDE-ANGLE OUTSIDE REARVIEW MIRROR

[76] Inventor: Everett R. Casey, 5845 Old Orchard Trail, Orchard Lake, Mich. 48033

[21] Appl. No.: 207,522

[22] Filed: Jun. 17, 1988

[51] Int. Cl.⁴ .......................... B60R 1/08; B60R 1/06; G02B 7/18
[52] U.S. Cl. ...................... 350/626; 350/632
[58] Field of Search ............ 350/626, 632, 606; 248/481–484, 476, 479

[56] References Cited

U.S. PATENT DOCUMENTS

| | | | |
|---|---|---|---|
| 2,419,306 | 4/1947 | Zeiler | 248/481 |
| 2,613,575 | 10/1952 | Falge | 248/481 |
| 2,636,419 | 4/1953 | Kerr | 350/627 |
| 2,663,224 | 12/1953 | Younglove | 350/626 |
| 2,845,000 | 7/1958 | Morley | 248/481 |
| 2,999,428 | 9/1961 | Mariani | 248/481 |
| 3,048,084 | 8/1962 | Iannuzzi | 350/626 |
| 3,790,117 | 2/1974 | Winkler | 350/626 |
| 4,598,982 | 7/1986 | Levine | 350/626 |

FOREIGN PATENT DOCUMENTS 2472493  7/1981  France .................. 350/626

*Primary Examiner*—Jon W. Henry

[57] ABSTRACT

An auxiliary, safety, wide-angle, convex mirror for ready and simple association with a vehicle-mounted outside rearview mirror which has a reflective glass pivotally mounted within and spaced from the peripheral lip of an outer shell, the auxiliary mirror being secured to the peripheral lip outboard of the rearview mirror.

15 Claims, 1 Drawing Sheet

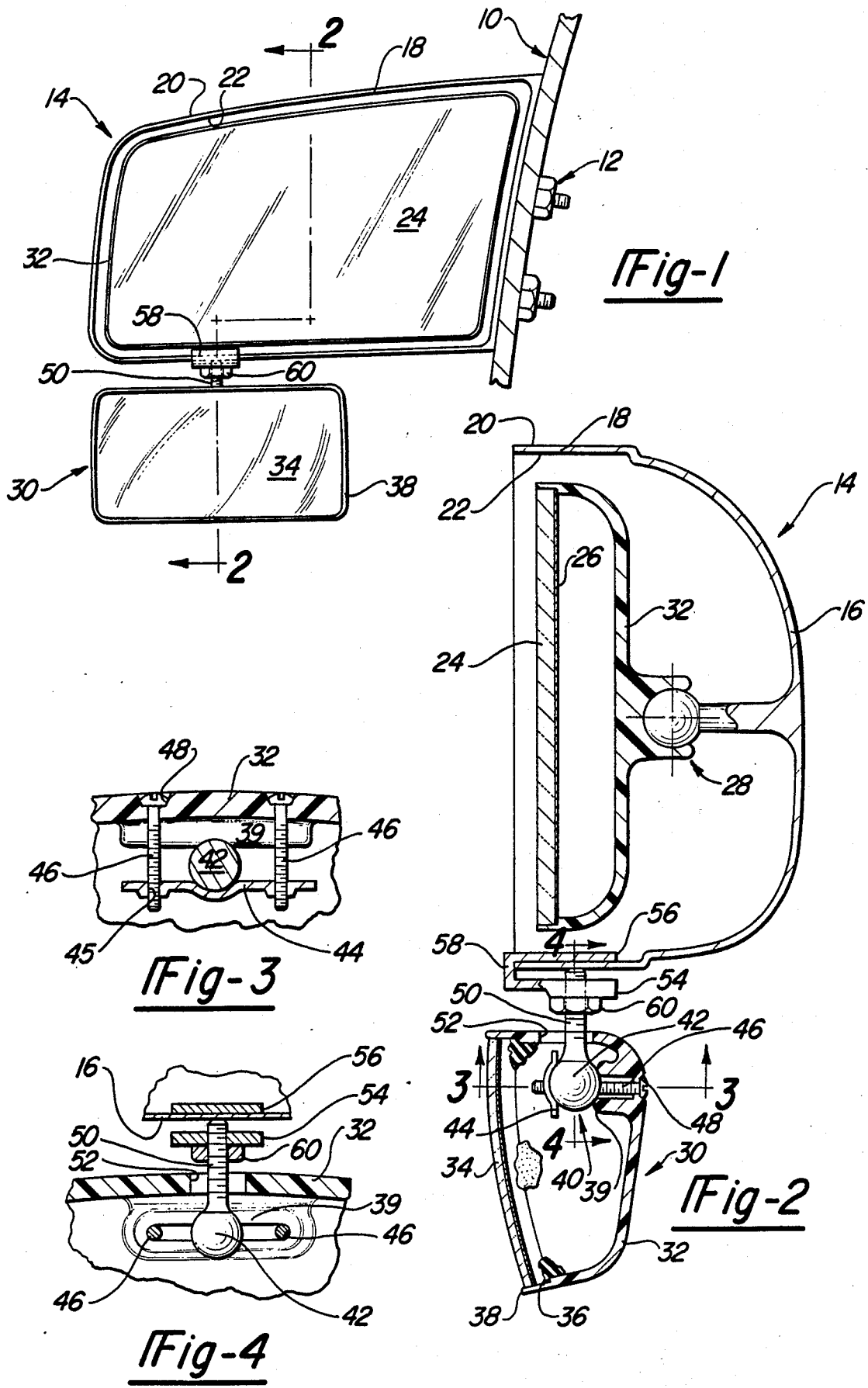

READILY ATTACHABLE AUXILIARY WIDE-ANGLE OUTSIDE REARVIEW MIRROR

BACKGROUND OF THE INVENTION

This invention relates to vehicle mirrors and more particularly to auxiliary, convex, wide-angle, outside rearview mirrors for ready mounting in non-vision-blocking relationship on a vehicular rearview mirror.

It has long been recognized that rearview mirrors on cars and trucks provide, at best, but a limited field of view that the "blind spot" areas not reflected in the mirrors are important to safety, and that some good remedy for that shortcoming of customary rearview mirrors should be found. The patent literature reflects much effort over the years directed towards the solution of the problem (see, e.g., U.S. Pat. Nos. 1,114,559; 2,582,651; 3,009,392; 3,146,296; 3,375,053; 3,588,233; 3,667,833; 4,345,819; 4,637,694; and Des. No. 231,520, as representative). The principal commercial efforts to meet the need known to me, apart from the car-manufacturer's use of fairly large radius convex glass (often in the range of about 2 to 3 foot radius) in passenger-side mirrors, are the "bull's eye" convex mirrors designed to be glued directly to the face of the flat-glass mirror. These "bull's eye" glass-mounted mirrors have met with some commercial success for application on the large-sized truck mirrors, but for passenger-car mirrors, the convex mirrors for gluing onto the face of the flat glass must be unsatisfactorily small to avoid blocking an undue amount of the regular glass area, and have not proved to be a successful solution to the problem. I know of no adequate-sized, auxiliary, non-blocking, wide-angle outside rearview mirror which can be readily and simply mounted by the driver on the factory-supplied outside rearview mirror of current automobiles.

SUMMARY AND OBJECTS OF THE INVENTION

The object of the present invention is improve the safety of vehicles by providing an auxiliary wide-angle mirror for increasing the driver's effective field of view to the side and rear of the vehicle without diminishing the effective area of the principal mirror, and which can be simply and readily installed by the driver.

DESCRIPTION OF THE DRAWINGS

FIG. 1 is an elevational view, from the rear of a vehicle, showing the auxiliary mirror constituting the preferred embodiment of the invention associated with the factory-mounted outside rearview mirror;

FIG. 2 is a cross-sectional view taken substantially along the line 2—2 of FIG. 1;

FIG. 3 is a cross-sectional view taken substantially along the line 3—3 of FIG. 2; and FIG. 4 is a cross-sectional view taken substantially along the line 4—4 of FIG. 3.

DETAILED DESCRIPTION OF THE ILLUSTRATED EMBODIMENT

Automobiles of recent manufacture are equipped with a factory-mounted outside rearview mirror on the driver's side and often with such a mirror on the passenger's side. The former are normally flat glass, the latter are often convex glass. Both such mirrors provide but limited fields of view, resulting in areas significant to safety not being displayed to the driver.

FIGS. 1 and 2 of the drawings illustrate a portion of the body 10 of a passenger car, to which is mounted, by any known means 12, a factory-installed outside rearview mirror 14. (Sometimes there is an arm connecting the mirror 14 to the side window area or the door panel of the automobile.) Mirror 14 is intended to be typical of the great majority of passenger-car outside rearview mirrors in current production (the details of which are incorporated herein by reference). It has a concave outer shell 16 which is closed toward the front of the vehicle, and has a rearward (of the vehicle) opening defined by a peripheral lip 18 having an outer lip surface 20 and an inner lip surface 22. The mounting means 12 is normally attached to or integral with the shell 16, and the shell itself is normally acceptably sturdy, usually being either a die casting or injection-molded plastic. The fore-and-aft extent of the peripheral lip is sometimes defined by a change in curvature of the shell 16, as illustrated. In some mirrors, the curvature is smooth so that the depth of the peripheral lip is not well defined, in which case I intend the peripheral lip to be just the final inch or less of the shell adjacent the opening thereof.

A reflective glass 24, often mounted in a mirror case 26, is supported within the shell 16. The majority of current mirrors are pivotally and adjustably mounted within the shell 16 by any suitable mechanism, symbolically represented by the pivot assembly 28, it being recognized that there is much variation in the pivot mechanisms and that many are in fact remotely controlled from inside the vehicle by linkages, cables or electrically-operated power packs.

Pivot assembly 28 customarily supports the reflective glass 24 a fraction of an inch inboard (towards the front of the vehicle) of the edge of the opening in the shell 16 and with the peripheral edge of the reflective glass 24 lying proximate to but spaced from the adjacent portions of the inner surface 22 of the peripheral lip 18. That spacing will vary from mirror to mirror and will vary with the adjusted position of the reflective glass. In addition, some factory-supplied mirrors have a gasket or the like covering the edge of the peripheral lip, but generally there is a space between the inner surface of the lip (with or without gasket) and the edge of the reflective glass (or mirror case).

The auxiliary wide-angle mirror 30 is mounted outboard of the rearview mirror 14, that is, it is positioned laterally (below, above or to the side) of the mirror 14 and so positioned that it does not block the driver's view of any portion of the reflective glass 24. Mirror 30 includes a housing 32 (which may serve the functions of a shell or of a case, or both) shown to be concave with an opening directed towards the rear of the vehicle. Disposed within the opening of the hollow housing 32 is a convex mirror 34. In the illustrated best mode of practicing the invention, the mirror is glued (such as with room temperature vulcanizing RTV as commonly used by mirror manufacturers) to a peripheral shoulder 36 formed in the housing 32, as shown. The housing 30 may also have a peripheral lip 38 projecting rearwardly (of the vehicle) of the mirror 34.

Housing 30, which may for example be injected molded of a suitable plastic such as ABS (acrylonitrile butadiene styrene), is provided on its inner wall with a projection defining a ball socket 38 (FIGS. 2 and 3) having a generally spherical surface. The ball portion 42 of a ball stud 40 is disposed in engagement with socket 38 and is retained thereon by a socket plate 44 having a spherically-surfaced concavity therein engaging the ball 42. Plate 44 has two tapped holes 45 spaced on opposite sides of said concavity for accepting screws 46 passing through holes 48 in the housing 32, with the heads of those screws engaging the housing 32 so as to exert forces clamping, with selectable force, ball 40 between plate 44 and socket 38.

In the illustrated best mode of practicing the invention, the threaded shank 50 of the ball stud 40 passes through an aperture 52 (which is large enough to permit the desired degree of pivotal movement) in the housing 32 an threadedly engages a tapped hole in one leg 54 of a generally U shaped clip 55 the opposite leg 56 of which is disposable in engagement with the inner surface 22 of the peripheral lip 18, and the bight portion 58 of which is proximate (touching, or not) the rearmost edge of the lip 18. The auxiliary mirror is secured to the lip 18, in the illustrated embodiment, by clamping forces between the inner surface of the leg 56 and the end of the stud 50 as it engages the outer surface 20 of the lip 18. It has been found that even if the leg 56 is made 1/16" thick or so, it will not impede the movement of the glass 24 in tilting on all mirrors on which it was tried, even though the leg 56 is made long enough to occupy a portion of the space between the mirror 24 and the inner surface 22 of the lip 18 in at least some of the tilted positions of the glass 24. In the illustrated unit the leg 56 is long enough to insure that a portion thereof engages the inner surface 22 at an area aligned with the stud 50.

In the preferred mode of assembly of the auxiliary mirror 30 to the rearview mirror 14, initial threaded engagement is established between the clamp 55 and the threaded stud 50, the clamp 50 is loosely positioned on the lip 18 at the desired location, and the entire auxiliary mirror 30 is rotated (about the longitudinal axis of the stud 50) until the end of the stud 50 properly clampingly engages the outer surface 20 of the peripheral lip 18. In that preferred mode, the screws 46 are initially tightened sufficiently to permit the mirror 30 to serve as a wrench to screw the stud 50 into the leg 54, and it is feasible to adjust those screws so that the ball 40 will slip in the socket 38 if excessive torque is applied to tend to damage or fracture the lip 18. Once the auxiliary mirror 30 is thus secured to the rearview mirror 14, the auxiliary mirror can be adjusted by the driver to the optimum viewing angle (loosening the screws 46 a bit to do so if necessary), after which, if desired, the screws 46 may be tightened to effectively lock the auxiliary mirror in place.

Obviously, other methods of assembly may be employed, including, as an example, placing a screwdriver slot or socket on the surface of the ball 42 opposite the stud 50, screwing the ball stud 40 into clamping engagement with the lip 18 first, then inserting the ball through the aperture 52 into the area between the plate 40 and the socket 38, and thereafter tightening the screws 46.

In either suggested mode of assembly, the most that is required in the way of tools is a screwdriver or equivalent. If desired, a locknut 60 may be employed, using a wrench or pliers if it is desired to snug that nut more than finger tight, but such a locknut is not necessary. In either suggested mode of assembly, the auxiliary mirror can be readily attached to the principal mirror in a fraction of a minute, without any drilling of holes being required.

In the illustrated preferred arrangement, the clip or clamp 55 in conjunction with the end of stud 50 constitute securing means securable to the peripheral lip of the rearview mirror 14, the shank of the ball stud 40 serves as a means for connecting that securing means to the housing 32, and the combination serves as a support mean for supporting the housing 32 proximate to the outer surface of the peripheral lip 18.

While the auxiliary mirror 30 has been illustrated in FIG. 1 as being disposed below the rearview mirror 14 and somewhat outboard of center, it is contemplated that the mirror 30 can be mounted on top of mirror 14 or to the outside thereof. Additionally, while the auxiliary mirror 30 can well serve in conjunction with a flat-surfaced principal mirror, it can also be of aid on the passenger side of the vehicle in conjunction with mirrors which are convex but which may well have a much greater radius of curvature. It is presently preferred that the mirror 34 have a radius of curvature in the range of 8" to 15", although greater or lesser curvatures can be employed. It is also preferred that the mirror 34 be about in plane (fore and aft of the vehicle) with the glass 24.

In the illustrated preferred arrangement, the auxiliary mirror is pivotally adjustable, both about a horizontal fore-and-aft axis (to parallel the housing 30 with the rearview mirror 14), about a transverse horizontal axis (to set the proper up-and-down viewing angle) and about a vertical axis (to set the proper sideways viewing angle), although the term pivotally or pivotably is used herein to connote rotation about one or more axes. With a convex-mirror radius in the preferred range, one setting may well suit all drivers of the vehicle, particularly if the mirror is of adequate size, preferably 1½ inches tall and 3 to 4 inches wide, the illustrated embodiment having a glass size of 2"×4". It is also contemplated that the mounting means for mounting the mirror 34 within the housing 30 may itself be pivotably adjustable, similar to that illustrated for mirror 14, that is, that the pivotal adjustment may be between the mirror 34 and the housing 32 rather than (or additionally to) the pivotable adjustment between the housing 30 and the shell 14. The principal need for pivotable adjustment about a transverse (of the vehicle) horizontal axis is that the angle between the horizontal and that portion of the lip 18 with which the auxiliary mirror 30 is associated differs from one model of vehicle to another. It is alternatively contemplated that in some circumstances, the housing 32 can simply be adhered (as by glue) to the housing 16, with or without a preliminary tilting adjustment of the secured angle, with or without an integral counterpart of leg 56.

It will be observed that the distance between the two legs of the clip 55 should be great enough to accommodate the thickness of the lip 18 with which the unit is to be associated, and that the stud 50 should be long enough to permit the required degree of pivotable adjustment of the mirror 30.

While the disclosed embodiment represents the presently preferred embodiment of the invention and the best mode of practicing the invention, it is purely illustrative, and the invention includes those auxiliary mirrors which come within the spirit and scope of the appended claims and equivalents thereof.

What is claimed is:

1. In combination, a vehicle-mounted outside rearview mirror having a reflective glass disposed within a mirror shell having a rearwardly directed opening defined by a peripheral lip extending generally towards the rear of the vehicle, said peripheral lip having an inner surface and an outer surface, said reflective glass being adjustably pivotally supported within the mirror shell with the edges of said reflective glass lying proximate to but spaced from the adjacent portions of the inner surface of said peripheral lip of said mirror shell, and an auxiliary, wide-angle, convexglass blind-spot mirror comprising a wide-angle convex mirror member, and support means for supporting said convex mirror member proximate to the outer surface of said peripheral lip of said rearview mirror comprising securing means securable to said peripheral lip of said rearview mirror, and means connecting said securing means to said convex mirror member.

2. The combination of claim 1 in which said securing means comprises clamp means having a first portion engageable with a portion of the inner surface of said peripheral lip and an opposing portion engageable with a portion of the outer surface of said peripheral lip.

3. The combination of claim 2 in which said first portion lies between the inner surface of said peripheral lip and the edge of said reflective glass in at least some of the adjusted positions of said reflective glass.

4. The combination of claim 2 in which said means for connecting said securing means to said convex mirror member includes a ball stud having a shank the end of which constitues said opposing portion of said clamp means engageable with a portion of the outer surface of said peripheral lip.

5. In combination, a vehicle-mounted outside rearview mirror having a reflective glass disposed within a mirror shell having a rearwardly directed opening defined by a peripheral lip extending generally towards the rear of the vehicle, said peripheral lip having an inner surface and an outer surface, said reflective glass being adjustably pivotally supported within the mirror shell with the edges of the reflective glass lying proximate to but spaced from the adjacent portions of the inner surface of the peripheral lip of the mirror shell, and an auxiliary, wide-angle, convex-glass blind-spot mirror including a wide-angle convex mirror member, a housing, mounting means for mounting said convex mirror member within said housing, and support means for supporting said housing proximate to the outer surface of said peripheral lip of the rearview mirror comprising securing means securable to said peripheral lip of the rearview mirror, and means connecting said securing means to said housing.

6. The combination of claim 5 in which one of said mounting means and said support means includes a pivotable member.

7. The combination of claim 5 in which said convex mirror is adjustable pivotably supported relative to said outside rearview mirror.

8. The combination of claim 5 in which said support means pivotably adjustably supports said housing relative to said peripheral lip of said rearview mirror.

9. The combination of claim 5 in which said securing means comprises clamp means having a first portion engageable with a portion of the inner surface of said peripheral lip and an opposing portion engageable with a portion of the outer surface of said peripheral lip.

10. The combination of claim 9 in which said means for connecting said securing means to said housing comprises a ball and socket joint.

11. The combination of claim 9 in which said first portion lies between the inner surface of said peripheral lip and the edge of said reflective glass in at least some of the adjusted positions of said reflective glass.

12. The combination of claim 11 in which said ball and socket joint includes a ball stud having a shank and in which said shank is an element of said securing means.

13. The combination of claim 12 in which said opposing portion engageable with a portion of the outer surface of the peripheral lip is an end surface of said shank.

14. In combination, a vehicle-mounted outside rearview mirror having a reflective glass disposed within a mirror shell having a rearwardly directed opening defined by a peripheral lip extending generally towards the rear of the vehicle, said peripheral lip having an inner surface and an outer surface, said reflective glass being adjustably pivotally supported within the mirror shell with the edges of the reflective glass lying proximate to but spaced from the adjacent portions of the inner surface of said peripheral lip of said mirror shell, and an auxiliary, wide-angle, convexglass blind-spot mirror comprising a wide-angle convex mirror member, a housing, mounting means for mounting said convex mirror member within said housing, and support means for supporting said housing proximate to the outer surface of said peripheral lip of said rearaview mirror comprising a clamp member having a first leg insertable into the rearward opening of the mirror shell and into engagement with the inner surface of said peripheral lip of said shell, having a second leg disposable proximate the outer surface of said peripheral lip of said shell, and having a bight portion interconnecting said first and second legs, a threaded member threadedly engaging said second leg of said clamp member and having an end portion engageable with the outer surface of said peripheral lip to clamp a portion of said peripheral lip between said first leg and said end portion, and means connecting said clamp member to said housing.

15. The combination of claim 14 further including a ball stud having a ball portion and threaded shank, socket means within said housing engageable with said ball portion for pivotally supporting said housing and serving as said means for connecting said clamp member to said housing, said threaded shank of said ball stud being said threaded member.

* * * * *